(12) United States Patent
Eismann et al.

(10) Patent No.: US 9,710,240 B2
(45) Date of Patent: Jul. 18, 2017

(54) METHOD AND APPARATUS FOR FILTERING OBJECT-RELATED FEATURES

(75) Inventors: Ethan A. Eismann, Oakland, CA (US); Narciso B. Jaramillo, Piedmont, CA (US); Robert Tyler Voliter, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 937 days.

(21) Appl. No.: 12/271,868

(22) Filed: Nov. 15, 2008

(65) Prior Publication Data

US 2014/0033084 A1    Jan. 30, 2014

(51) Int. Cl.
| | | |
|---|---|---|
| *G06F 3/0481* | (2013.01) | |
| *G06F 3/0482* | (2013.01) | |
| *G06F 3/0483* | (2013.01) | |
| *G06Q 10/10* | (2012.01) | |
| *G06F 9/44* | (2006.01) | |

(52) U.S. Cl.
CPC ..................................... *G06F 8/38* (2013.01)

(58) Field of Classification Search
CPC .... G06F 3/0481; G06F 9/4443; G06F 3/0482; G06F 3/04847; G06F 3/04817; G06Q 10/10; H04N 5/44543
USPC ........................................ 715/810, 764, 800
See application file for complete search history.

(56) References Cited

U.S. PATENT DOCUMENTS

| | | | |
|---|---|---|---|
| 5,359,712 A * | 10/1994 | Cohen et al. ................. 715/723 |
| 5,519,825 A | 5/1996 | Naughton et al. | |
| 5,642,511 A | 6/1997 | Chow et al. | |
| 5,742,848 A | 4/1998 | Burgess | |
| 5,801,687 A | 9/1998 | Peterson et al. | |
| 5,862,372 A | 1/1999 | Morris et al. | |
| 5,862,379 A | 1/1999 | Rubin et al. | |
| 5,999,173 A * | 12/1999 | Ubillos ......................... 715/724 |
| 6,144,375 A * | 11/2000 | Jain et al. ..................... 715/251 |
| 6,396,520 B1 | 5/2002 | Ording | |
| 6,414,686 B1* | 7/2002 | Protheroe et al. ............ 345/474 |
| 6,469,723 B1 | 10/2002 | Gould et al. | |
| 6,512,522 B1* | 1/2003 | Miller et al. .................. 345/474 |

(Continued)

FOREIGN PATENT DOCUMENTS

EP    0907132    *  7/1999

OTHER PUBLICATIONS

"Key Frame", [online]. *Wikipedia®, the free encyclopedia*.[retrieved Sep. 18, 2008]. Retrieved from the Internet: <URL:http://en.wikipedia.org/w/index.php?title=Key_frame&printable=yes>, (2008), 3 pgs.

(Continued)

*Primary Examiner* — Kevin L Young
*Assistant Examiner* — Erik Stitt
(74) *Attorney, Agent, or Firm* — Shook, Hardy & Bacon L.L.P.

(57) ABSTRACT

A method and apparatus for filtering the set of object features of a user interface and presenting the filtered set of object features for display on a display device associated with a computer system. In one example, the system generates transition timeline data for state transitions in the user interface and filters the transition timeline data as a function of a state of the user interface to generate a filtered list of transitions for display of a transition timeline. The filtering is a function of a state of the user interface.

21 Claims, 11 Drawing Sheets

(56) References Cited

U.S. PATENT DOCUMENTS

| | | | |
|---|---|---|---|
| 6,564,368 B1 | 5/2003 | Beckett et al. | |
| 6,823,495 B1 | 11/2004 | Vedula et al. | |
| 7,159,185 B1 | 1/2007 | Vedula et al. | |
| 7,240,328 B2 | 7/2007 | Beckett et al. | |
| 7,326,199 B2 | 2/2008 | MacFarland et al. | |
| 7,398,002 B2* | 7/2008 | Hsiao et al. | 386/280 |
| 7,496,830 B2* | 2/2009 | Rubin et al. | 715/206 |
| 7,554,542 B1 | 6/2009 | Ferraro et al. | |
| 7,703,044 B2* | 4/2010 | Graham | 715/838 |
| 7,805,678 B1* | 9/2010 | Niles et al. | 715/716 |
| 7,904,815 B2* | 3/2011 | Hua et al. | 715/726 |
| 7,917,861 B2 | 3/2011 | Boettcher et al. | |
| 7,966,577 B2 | 6/2011 | Chaudhri et al. | |
| 8,209,633 B1 | 6/2012 | Eismann et al. | |
| 8,458,595 B1* | 6/2013 | Margulis | 715/723 |
| 8,572,088 B2* | 10/2013 | Lu et al. | 707/739 |
| 8,751,022 B2* | 6/2014 | Eppolito | 700/94 |
| 2002/0130873 A1 | 9/2002 | Takakura et al. | |
| 2003/0002851 A1* | 1/2003 | Hsiao et al. | 386/52 |
| 2004/0027368 A1* | 2/2004 | Snyder et al. | 345/716 |
| 2005/0099385 A1* | 5/2005 | Schick et al. | 345/156 |
| 2005/0231510 A1 | 10/2005 | Santos | |
| 2006/0132482 A1* | 6/2006 | Oh | 345/419 |
| 2006/0214935 A1* | 9/2006 | Boyd et al. | 345/473 |
| 2006/0282776 A1* | 12/2006 | Farmer et al. | 715/719 |
| 2007/0089152 A1* | 4/2007 | Patten et al. | 725/134 |
| 2008/0301625 A1* | 12/2008 | Cook et al. | 717/104 |
| 2009/0219294 A1 | 9/2009 | Young et al. | |
| 2010/0064222 A1 | 3/2010 | Tilton | |
| 2010/0082498 A1* | 4/2010 | Sadeghi | G06Q 10/103 705/301 |
| 2010/0095236 A1 | 4/2010 | Silberstein et al. | |
| 2010/0241939 A1* | 9/2010 | Rozen-Atzmon | 715/202 |
| 2011/0243525 A1* | 10/2011 | Chaudhri et al. | 386/234 |
| 2014/0033084 A1 | 1/2014 | Eismann et al. | |

OTHER PUBLICATIONS

"Microsoft Expression Blend", *Wikipedia®, the free encyclopedia*. [online]. [retrieved Sep. 18, 2008]. Retrieved from the Internet: <http://en.wikipedia.org/wiki/Microsoft_Expression_Web>, (2008), 1 pg.

"U.S. Appl. No. 12/242,873, Non-Final Office Action mailed Oct. 5, 2011", 9 pgs.

"U.S. Appl. No. 12/242,873, Response filed Jan. 5, 2012 to Non-Final Office Action mailed Oct. 5, 2011", 10 pgs.

"U.S. Appl. No. 12/242,878, Response filed Jan. 11, 2011 to Restriction Requirement mailed Oct. 12, 2011", 7 pgs.

"U.S. Appl. No. 12/242,878, Restriction Requirement mailed Oct. 12, 2011", 7 pgs.

U.S. Appl. No. 12/242,873, Notice of Allowance mailed Feb. 29, 2012, 8 pgs.

U.S. Appl. No. 12/242,878, Non Final Office Action mailed Feb. 29, 2012, 8 pgs.

Notice of Allowance mailed Feb. 12, 2012 in U.S. Appl. No. 12/242,873, 8 pages.

"U.S. Appl. No. 12/242,878 , Response filed May 29, 2012 to Non Final Office Action mailed Feb. 29, 2012", 9 pgs.

"U.S. Appl. No. 12/242,878, Examiner Interview Summary mailed Jan. 4, 2013", 3 pgs.

"U.S. Appl. No. 12/242,878, Final Office Action mailed Sep. 27, 2012", 8 pgs.

"U.S. Appl. No. 12/242,878, Response filed Dec. 26, 2012 to Final Office Action mailed Sep. 27, 2012", 12 pgs.

* cited by examiner

METHOD AND APPARATUS FOR FILTERING OBJECT-RELATED FEATURES

COPYRIGHT

A portion of the disclosure of this document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document: Copyright© 2008, Adobe Systems Incorporated. All Rights Reserved.

TECHNICAL FIELD

The present application relates generally to the technical field of algorithms and programming and, in one specific example, Integrated Development Environment (IDE) tools for developing Graphical User Interfaces (GUIs).

BACKGROUND

Software development tools serve to simplify the creation of software applications, web services and web sites, including GUIs. These tools are often included in an Integrated Development Environment (IDE). As the complexity and options available to use and build software applications increases, presentation of options to the designer becomes difficult to manage. The facility to implement a variety of tools and options may require the designer to open several windows or click through several menus. There is a need to simplify the design process and streamline the presentation of options to the user.

BRIEF DESCRIPTION OF THE DRAWINGS

Some embodiments are illustrated by way of example and not limitation in the figures of the accompanying drawings in which.

DETAILED DESCRIPTION

Figure 1:
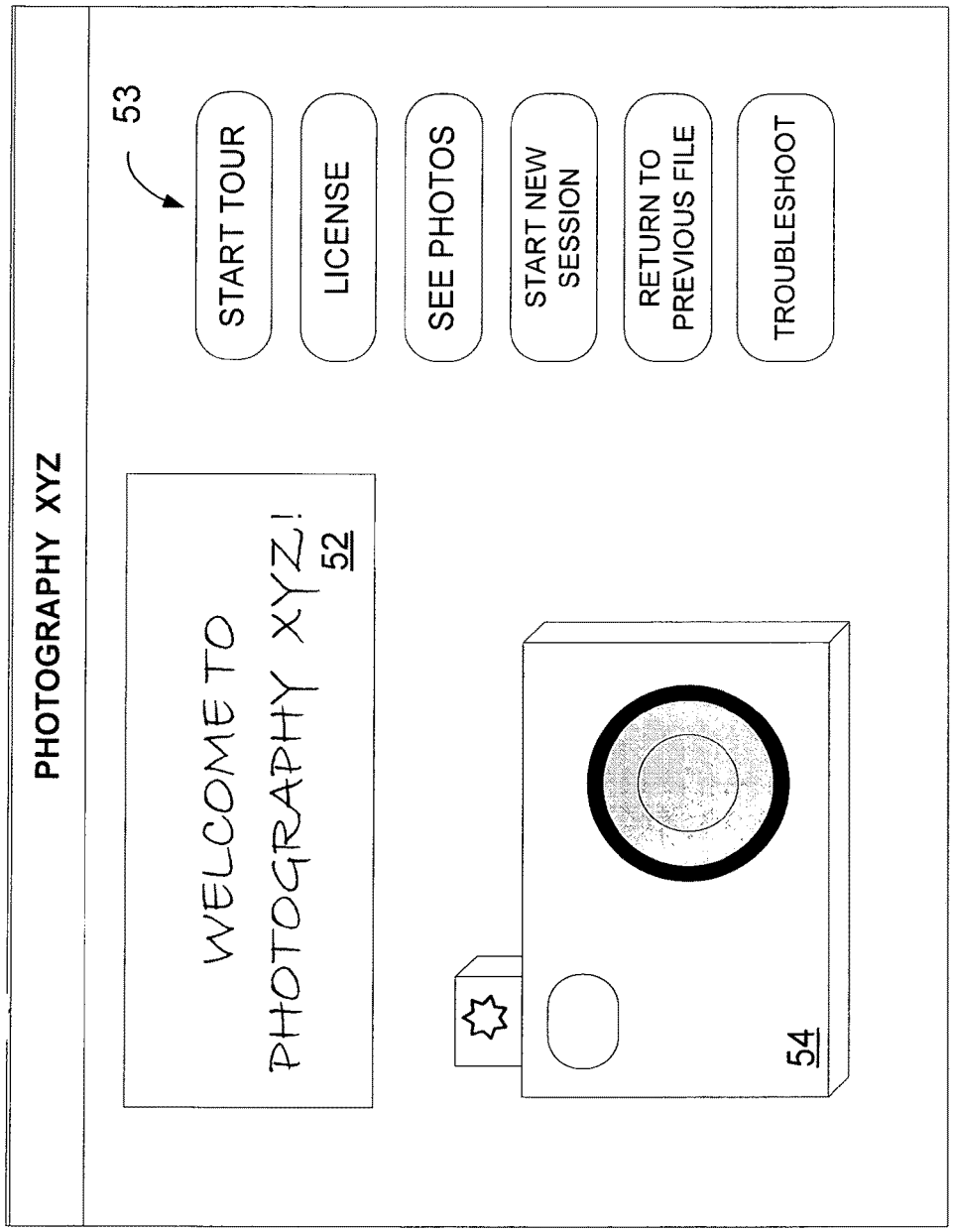
FIG. 1 is a diagram of a page of a user interface, according to an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In building a user interface for a system, software application, website, web service or other computing tool, the designer is building the interface and display for a user to interact with the application or device. For interaction with electronic devices, including computers, hand-held devices, mobile devices, gaming devices, MP3 Players, household appliances and office equipment, the GUI is designed to fully represent the information and actions available to the user.

In one embodiment, a GUI builder is a software development tool for simplifying creation of GUIs. The GUI builder allows the designer to arrange objects using a drag-and-drop What You See is What You Get (WYSIWYG) editor. A GUI builder may be part of an Integrated Development Environment (IDE) or may be a stand-alone tool. A designer uses the GUI builder to create an interface to ease the experience of users of the application or device. The user accesses the functionality of the application or device through representative graphical elements in the GUI, and therefore, a GUI will often include multiple graphical and/or audio objects in various configurations. Each configuration of objects is referred to as a page or state of the user interface. To clarify the terminology herein, each configuration of objects for a user interface of the example embodiments is referred to as a "page." A state is then an expression of a page.

In some example embodiments, a system and method are illustrated for building a GUI having one or more pages each including one or more objects. A GUI designed for presentation to a user is illustrated in FIG. 1. Page 1 includes objects 52, 53, and 54 in a first configuration. Example objects include a component, a widget, a user interface control, a layer, a group, a graphic artwork/icon, text, or a path. Each object included on page 1 has a corresponding visually displayed icon, and has associated attributes and/or methods. Collectively, object attributes and methods are referred to as object features. Object features define object behavior during interaction with a user of the device or application. A page is also considered an object; specifically, a page is a composite object made up of individual objects each having various features. The features of a page then include the features of the individual objects contained therein. A page may be dynamic and may change over time, or may change due to the occurrence of an event. Each object on page 1 is defined by a state and a behavior. As a page may be considered an object, it follows that a page is defined by a state and a behavior. It may be simpler to think of a page as a configuration of objects, wherein the state of the page is the state of each of the objects in the configuration. An object may be shared between pages, such as the title "PHOTOGRAPHY xyz" which displays on pages 1 and 2.

In one example, the welcome box 52 is a static display without additional functionality. The buttons 53 each have functionality defined by their associated methods or actions. For example, each button 53 has a different defined behavior when selected. Selection of the first button will start a tour of the application. Other buttons 53 will open documents, link to other pages, run scripts, etc. The camera icon 54 may be a static display, may be displayed with the visual effect(s), such as the shutter opening and closing, or may have functionality associated with specific portions of the icon. For example, selection of the lens may open a pop-up window or balloon with information on lenses, etc. Other examples of objects include, but are not limited to: windows, text fields, radio buttons, sheets, browsers, scroll bars, sizable shapes, widgets, user interface controls, groups, graphic artwork and icons, paths, scroll views, pop-up lists, and other visual or audio components.

Figure 2:
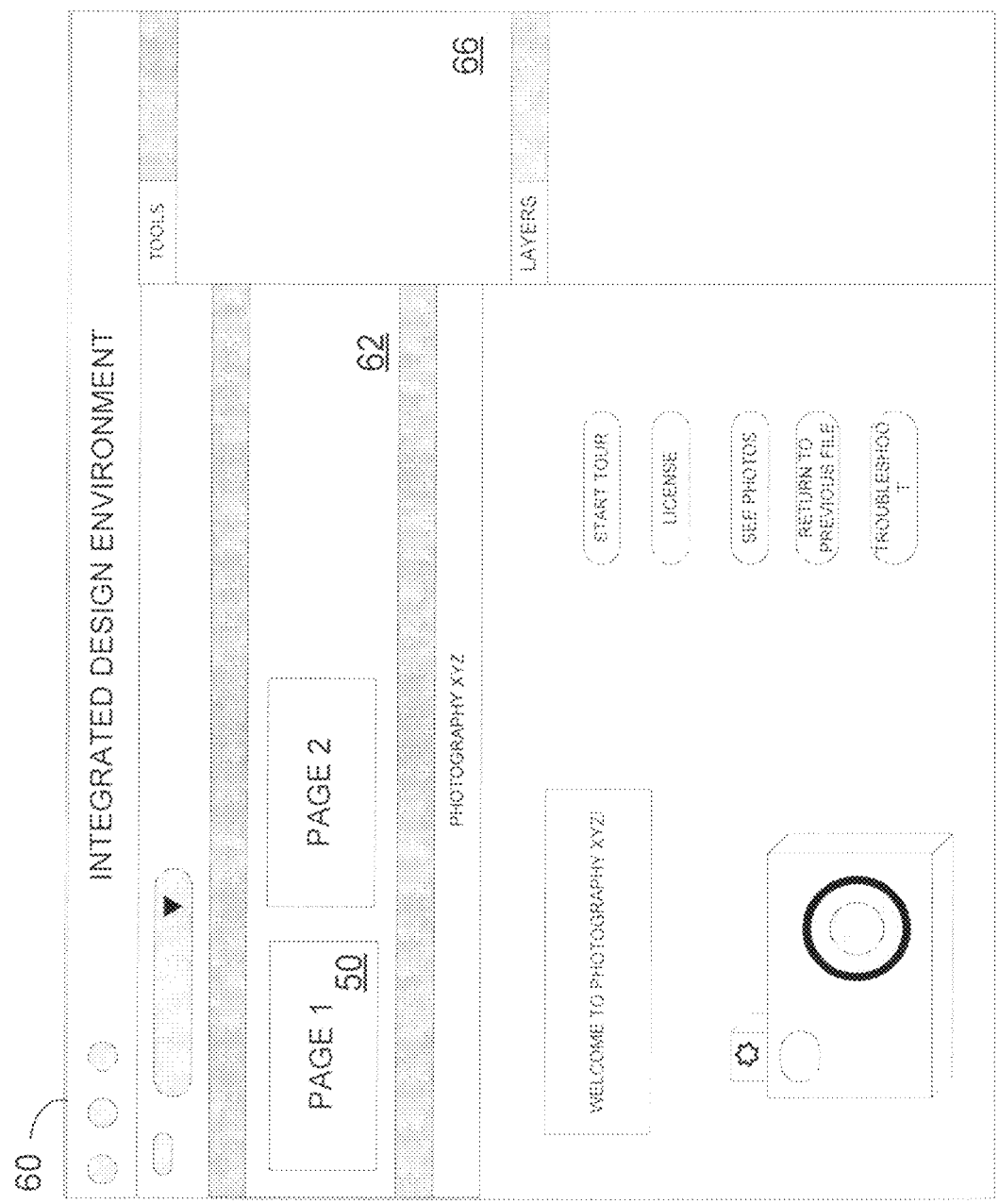
FIG. 2 is a diagram of a GUI Builder, part of an IDE, according to an example embodiment, for design of a user interface as in FIG. 1.

FIG. 2 illustrates display of a GUT builder used to create page 1. Illustrated in FIG. 2 is the designer interface of the GUT builder, which allows the designer to access the GUT builder and build a GUT. The GUT builder is laid out to provide significant information relating to the design of page 1 to the designer. Not only does the GUT builder provide the tools and work space to build a user interface, but provides a dashboard of the current status of the user interface. Through the GUI builder, the designer may access tools and templates easily, layout pages of a user interface, build functionality into an object or page; and define transitions between pages. As illustrated in FIG. 2, the GUI builder includes a section 62 for referencing the pages of the user interface and to create and modify the properties, methods and actions of objects. Here, the designer has created page 1 which is illustrated in the working section 64. The designer is able to build the display of page 1 in the working section 64, using tools from section 66. In this example, page 1 is selected in section 62, and therefore the working section 64 illustrates the configuration of objects for page 1. Selection of page 2 in section 62 will result in display of the configuration of page 2 in working section 64.

The layout of the GUI builder may position the sections in a different order or configuration, or may allow the designer to reconfigure the layout. Additionally, the GUI builder may include further widgets and windows, such as a Heads Up Display (HUD not shown) for display in the working section 64 of the GUI builder. The HUD is a window including a subset of available tools and functions which are proximate the design in process. The GUI builder may be a stand-alone component or may be part of an IDE.

Figure 3:
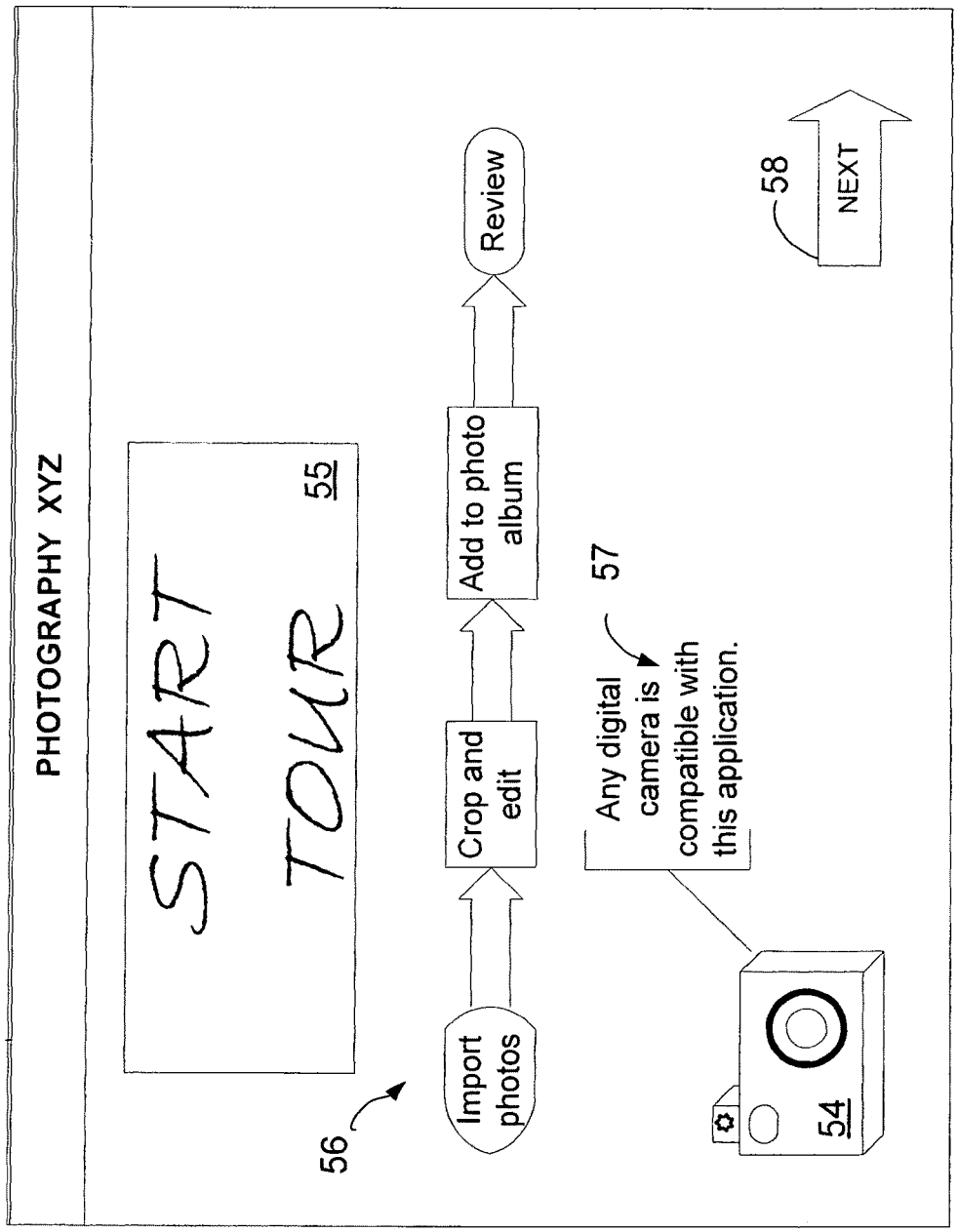
FIG. 3 is a diagram of a second page of the user interface of FIG. 1, according to an example embodiment.
Figure 4:
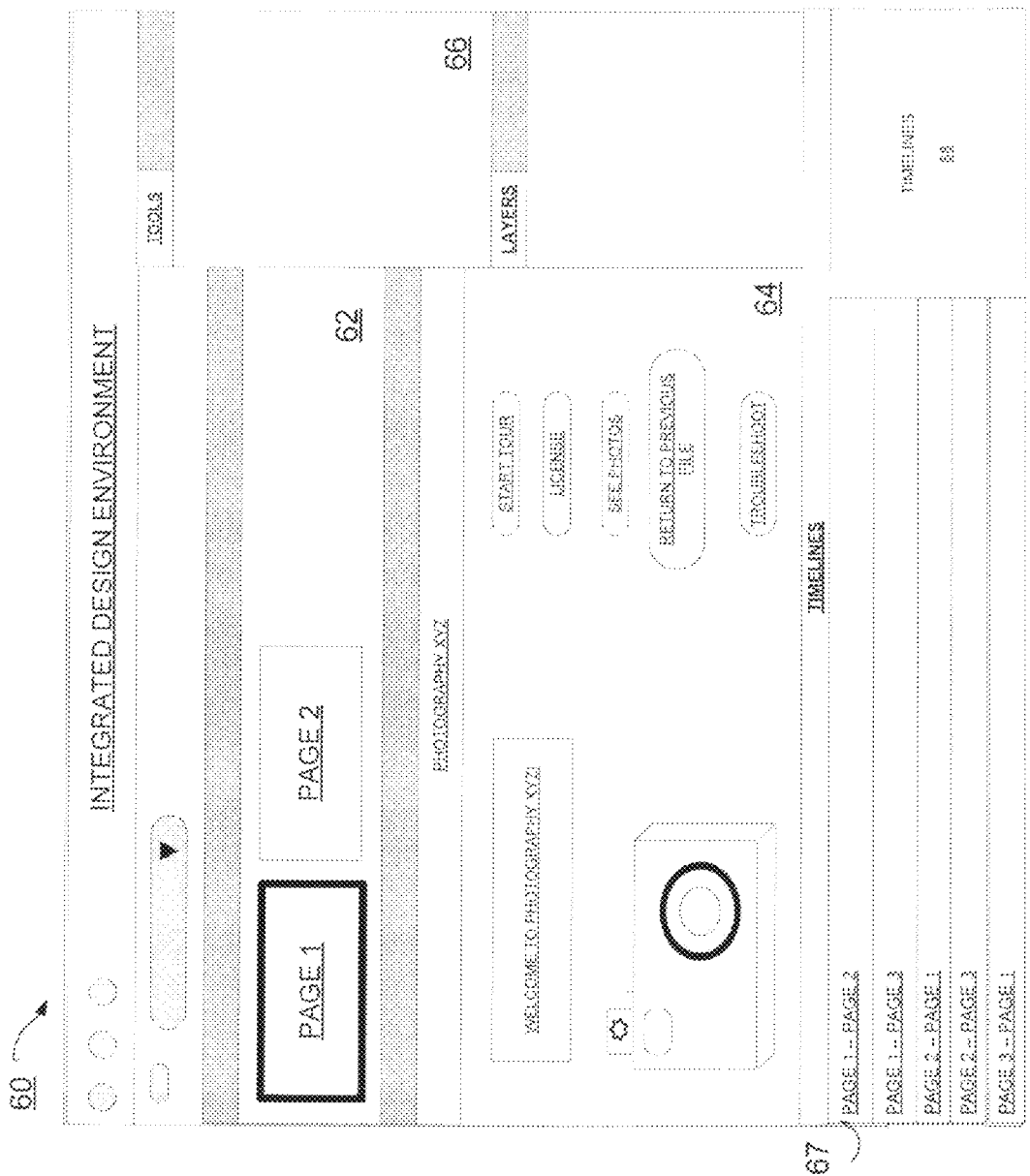
FIG. 4 is a diagram of a GUI builder, according to an example embodiment, for design of the second page of the user interface, as illustrated in FIG. 3, including transition timeline display area.

A GUI may include multiple pages. A change from one page to a next page is referred to as a transition. Continuing with the GUI design, the designer creates a next page, page 2. Additionally a GUI area called timelines 68 provides a visual mechanism to edit transitions and other time-based sequences. The designer specifies the GUI to transition from page 1 to page 2 on specific conditions, such as selection of a particular button on page 1. FIG. 3 illustrates the display of page 2, including a stationary box 55 labeled "START TOUR," a chain of steps or methods 56 describing the processing in the application, the camera icon 54, a text box 57, and a next arrow or button 58. In this example, the GUI transition from page 1 (FIG. 1) to page 2 (FIG. 2) was triggered by selection of the button 53 on page 1, labeled "START TOUR" and illustrated in FIG. 1. The designer built page 2, including objects 54, 55, 56, 57, and 58 using the GUI builder. As illustrated in FIG. 4, section 62 of the GUI builder includes page 1 and page 2 of the GUI. The GUI builder also includes transition timeline data section 67, listing each of the possible page transitions. This example identifies two transitions, a transition from page 1 to page 2, and a transition from page 2 to page 1. To access the data for a given transition, the designer highlights the desired transition entry in a row of section 67.

A transition from one page to a next page has an associated set of features defining the transition. The transition data is displayed in area 68. Transitions may include animations or other visual or audio effects, may replace one page with a next page, or may place an object in one state into a different state. Additionally, a transition may trigger an action or other sequence of events not visible or audible to the user. The transition behavior or features may be user designated, generated by an algorithm, or be a default based on differences between states. A visual effect is a visually perceptible attribute associated with an object. An audio effect is an attribute associated with an object having audio characteristics. For illustrative purposes only, visual effects will be referenced herein. Example visual effects include a move effect, a wipe effect, a resize effect, a fade-in effect, a fade-out effect, or some other suitable effect. These visual effects may occur over time, or due to the occurrence of an event. Object attributes may or may not change over time. A transition in one example is a set of visual effects. In another example, a transition is a set of actions which change a method or a feature and may or may not cause a visible change, but may cause data to change. In another example, a transition involves selecting objects in a list or modifying data displayed. The features of a transition, as well as specifics of how objects are managed on transition, are specified in the transition timelines data section 67 of the GUI builder.

Figure 5:
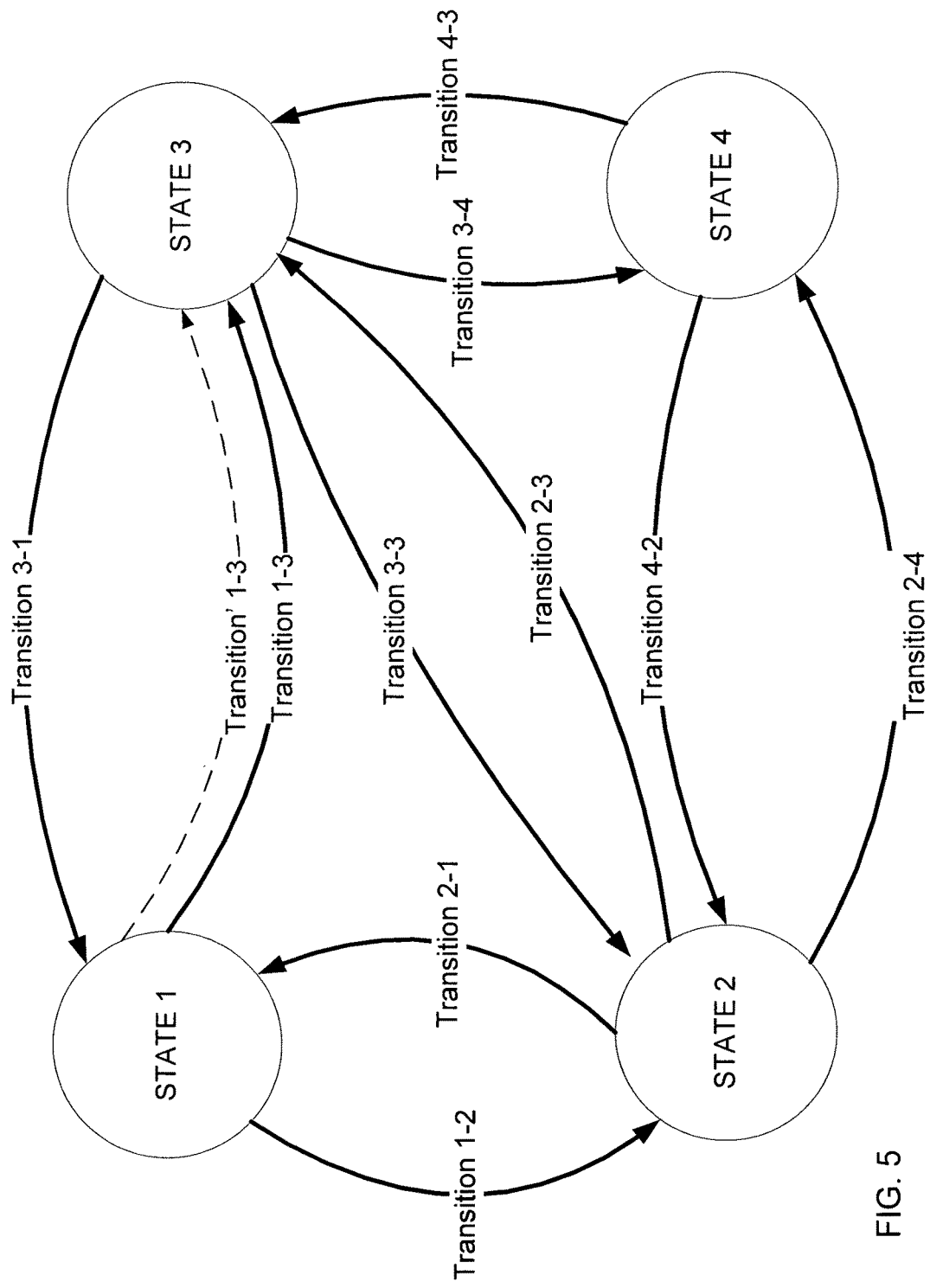
FIG. 5 is a diagram illustrating page transitions of a user interface, according to an example embodiment.

While the example of FIG. 4 identifies two pages, the number of possible transitions increases with the number of pages. For example, as illustrated in FIG. 5, in the case of a GUI having four states, there are ten or more potential transitions. It may be possible to have a fewer number of transitions, where transitions from one state to another is excluded. Consider page 2 illustrated in FIG. 3. The designer may create a tour of the application, where a user can go forward, by selection of the NEXT button 58, but cannot move backward. In this case, some of the state transitions are not allowed and not defined.

Each transition between states does not simply imply a change of state, but also defines the transition mechanism. For example, in transition from one state to another, a first object may fade into view while another object fades from view. Alternatively, objects may slide across the screen, or have some other behavior.

It is possible that different triggering events may define different transition behavior. For example, a transition from STATE 1 to STATE 3 may be triggered by user selection of a button, or may be triggered by user moving the curser over a portion of text. Each of these transitions may be defined to have different behaviors, even though the end result is to display the page in STATE 3. The alternate transition is illustrated with a dashed line.

In one example embodiment, the visual effects are user selected from a transition timeline display area, such as section 67 of FIG. 4. User selection includes the use of an input device, such as a keyboard, mouse, light pen, touch screen, or other suitable input device. The associated functionality of the input device may include a right-click function, a mouse-over function, a left-click function, or some other suitable function. Each of these may be used to trigger a transition. In this way, there may be multiple triggers initiating a transition from STATE 1 to STATE 3.

Figure 6:
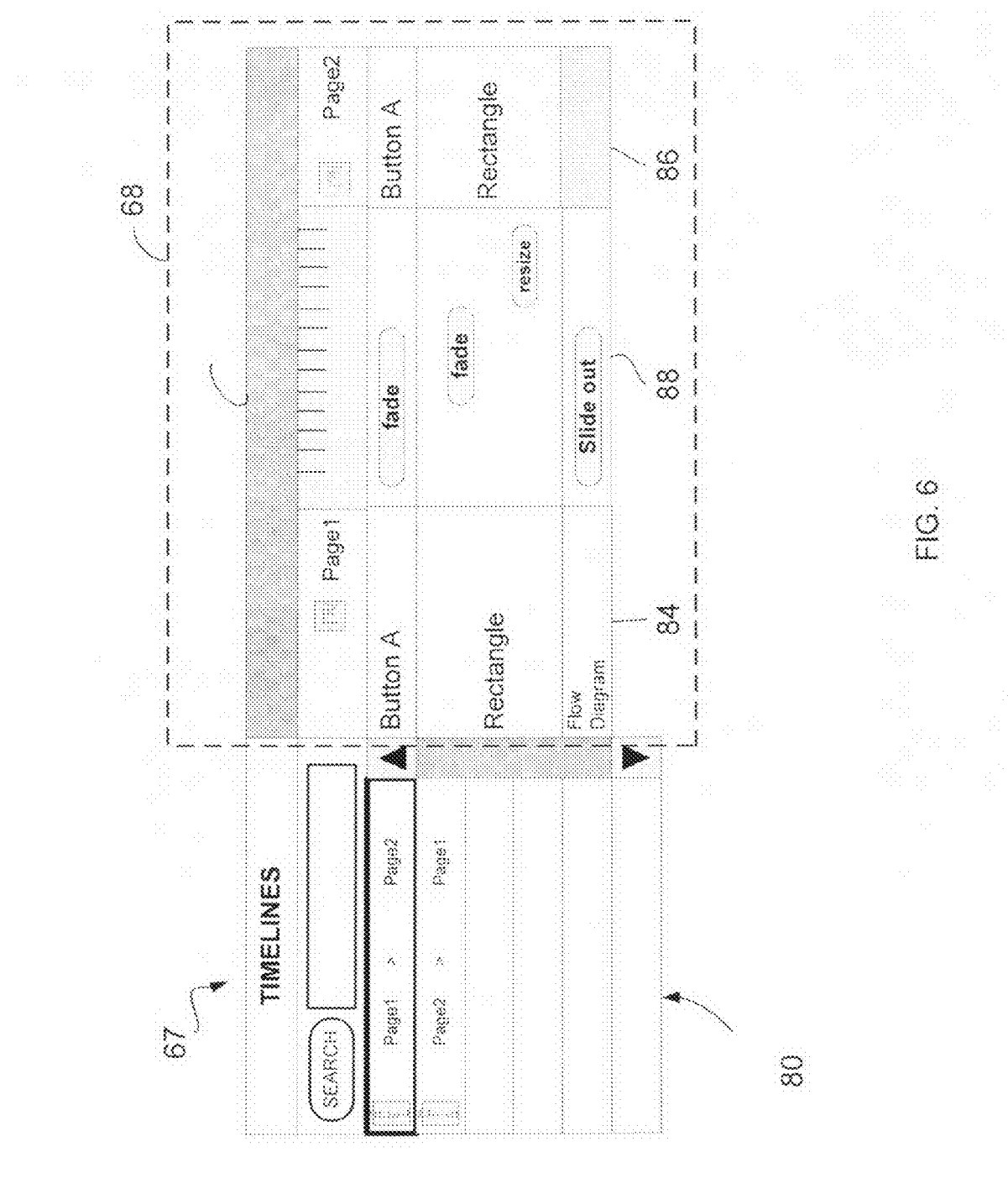
FIG. 6 is a diagram illustrating the transition timeline display area of the GUI builder of FIG. 4, according to an example embodiment.

Each transition having unique features and transmission timing. FIG. 6 is a detailed illustration of the transition timeline data section 67 of FIG. 4. The transition timeline data section includes a track list, which is a table organized in rows for each transition object, and columns for states (or pages) and visual effects. Each entry (e.g., row) in the track list is an object associated with a state. Further included as part of the entry in the track list is a start target in the form of an object, an end target in the form of an object. A track in the track list includes a visual effects bar(s) representing the transition between the start target and the end target. Further included, is an object icon, and a selection mechanism for selecting the object to associate with a state. A selection mechanism is a mechanism to associate an object with a state. Example selection mechanisms include a check box, radio button, or other suitable selection mechanisms. Also included in the timeline display area is a transition timeline used to set a time or event after the expiration or occurrence of which a transition will be complete. The organization of the transition data for display may be a function of the configuration of objects on a page or the number of transitions available for a given page.

In one example, a track list has three columns, wherein one column represents each object specified as part of an originating state ("fromSTATE"). A second column represents effects describing features of the each object in the first column. A third column represents the object in the target state ("toSTATE"). The second column contains the effects that describe the features of the object(s) in the first column that change when moving to the target state.

In some example embodiments, the visual effects are selected by default based upon the differences between objects associated with the two or more pages. A visual effect selected by default is a visual effect selected through the selection of a start state and an end state, where the features (e.g., the visual effect) of objects not in common between the states are used as the basis for generating the visual effects between the states. A set operation may be used to determine an object not in common between the states, where this set operation may be a union (∪), intersection (∩), set difference (−), Cartesian product (×), or some other suitable set operation. In some example embodiments, a combination of set operations may be used to an object not in common between the states. In some example embodiments, visual effects are configured such that the set of differences between two states can be recalculated to update the visual effects.

The transition timelines data section 67 lists all possible state transitions in column 80. The list of transitions is searchable, with a search entry field positioned at the top of column 80. The timeline scale 82 is provided across the top of the section 88, allowing specification of timing for transition events, such as definition of animation or other transitory effects for each transition listed in column 80. For a given transition, the timeline data specifies the configuration of objects on the originating or start page in column 84, and the configuration of objects on the new page or target page in column 86. In this example, as illustrated, the transition from page 1 to page 2 is highlighted. The details of columns 84, 88 and 86 specify this transition. The transition starts on page 1 and specifies at least one object is to fade out on the transition. Other objects may fade out or resize and are so specified. The designer creates a transition from page 1 to page 2 by defining how each object will change during the transition and may specify the timing of transition changes using the timeline scale 82.

As discussed above, as the number of pages increases, the number of potential transitions increases as well. To streamline presentation of information to the designer, the GUI builder may present a subset of all potential timelines. In one example, the list of transitions is filtered to present only those transitions associated with the current selected page. Consider the example of FIG. 4, where section 62 presents PAGE 1 and PAGE 2, and where PAGE 1 is currently selected. As PAGE 1 is selected, the state transitions column 80 of FIG. 6 would list the transitions associated with PAGE 1. In other words, column 80 would include any transition to or from PAGE 1, but would not list transitions in which PAGE 1 was not involved. The filtering is automatically done on selection of a given page. Other transitions are illustrated, these involves pages not shown.

In another example, the list of transitions may be filtered in response to a search request. When a keyword is entered into the search entry field, the list of transitions is reduced to those satisfying the search query. For example, a search for page 2 would result in display of only those transitions involving page 2. As an example, such filtering may allow complex search requests. This may include searching for multiple keywords, or relationships, such as searching for transitions to a first page, transitions from a second page, or any combinations thereof. The search may further identify all transitions having a specific transition feature, such as an animation. The search may identify all transitions having a specific type of object or combination of types of object. A variety of search techniques are possible with the goal of streamlining the information presented to the designer and targeting significant information.

The filtering process may be automated based on the current selected page. For example, as illustrated in FIG. 4, when page 1 is selected, the work space section 64 displays the configuration of objects for page 1. In this example embodiment, the list of transitions could be automatically filtered to list only those transition involving page 1 and instances of objects on page 1.

Figure 7:
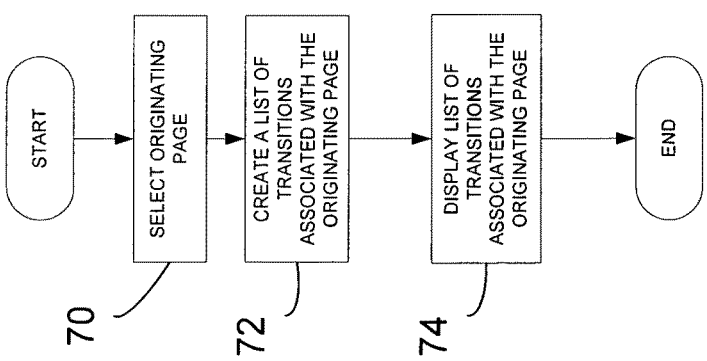
FIG. 7 is a flow diagram illustrating transition timeline filtering in a GUI builder, according to an example embodiment.

FIG. 7 is a flow diagram illustrating the filtering process according to one example. The designer selects an originating page, 70. The designer may designate the originating page by selecting the page for design in section 62 of the IDE 60 as in FIG. 4. In response, the process creates a list of transitions associated with the originating page, 72, and displays the transition list, 74, in the transition timelines data section 67.

In another example, the filtering is based on the defined action which triggered a transition. Each transition has an originating page, or from page, and is triggered by behavior of an object on the originating page and the object to which the action is attached. The originating object has an action which results in the transition. For example, START TOUR button 53 of FIG. 1 has an action to go to page 2. Any other page including the object START TOUR button 53 has the same action. A filtering process may receive the action information as input, and in response create a set of pages having the START TOUR button. This object has an action resulting in a transition to page 2 from any originating page containing the object. The filtering process then generates a list of transitions from pages including the object to the target page, page 2. The filtered list of transition then replaces the list of all potential transitions in the transition timelines data section 67.

Figure 8:
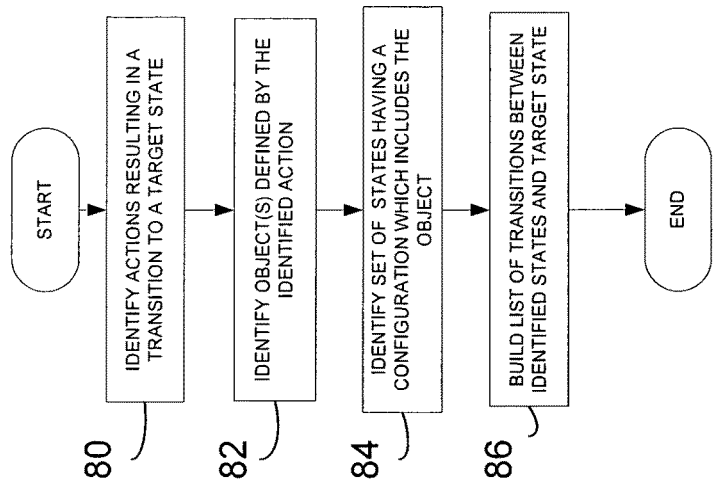
FIG. 8 is a flow diagram illustrating transition timeline filtering in a GUI builder, according to an example embodiment.

FIG. 8 is a flow diagram illustrating the process identifying an action or actions resulting in a transition to a target state, 80. Those objects having the identified action(s) are then identified, 82. The process identifies all states having the identified object(s), 84, and builds a list of transitions between these states and the target state, 86. It is possible to further filter the list once the states are identified, so as to provide more focused guidance to the designer.

The filtering process may be extended to other sections of the GUI builder or IDE, including tools, functions, objects, actions, etc. Any action, object, feature, or other component of the IDE which may impact an object is considered to have a relationship with the object. This includes, but is not limited to, selecting an object, editing an object, altering and object, viewing and object, moving a cursor over an object, searching within the IDE, accessing a page, state or object of the IDE, etc. The filtering process may be initiated by any of these, and other actions, components, objects or states related to an object. In this way, the actions, components, objects or states related to a given object may also have a relation to each other. In one example, the filtering results in display of a list of related transitions in the form of a pop-up menu next to display of each page in area 62. In another example, the filtering results in display of a list of related transitions in the form of a pop-up menu next to the UI that defines a method causing a state change, in a HUD for example. For example, selection of a given object is related to editing the given object. Searching in the IDE is another example of a trigger for filtering. In this case, the search criteria forms the filter criteria, wherein filtering results in a set of objects or features related to responses to the search. Accessing a page in the IDE may result in filtering for components on the page. The filtering may result in a set of related features objects. Similarly, rolling over an object or selecting an object may result in a set of related features or objects.

Figure 9:
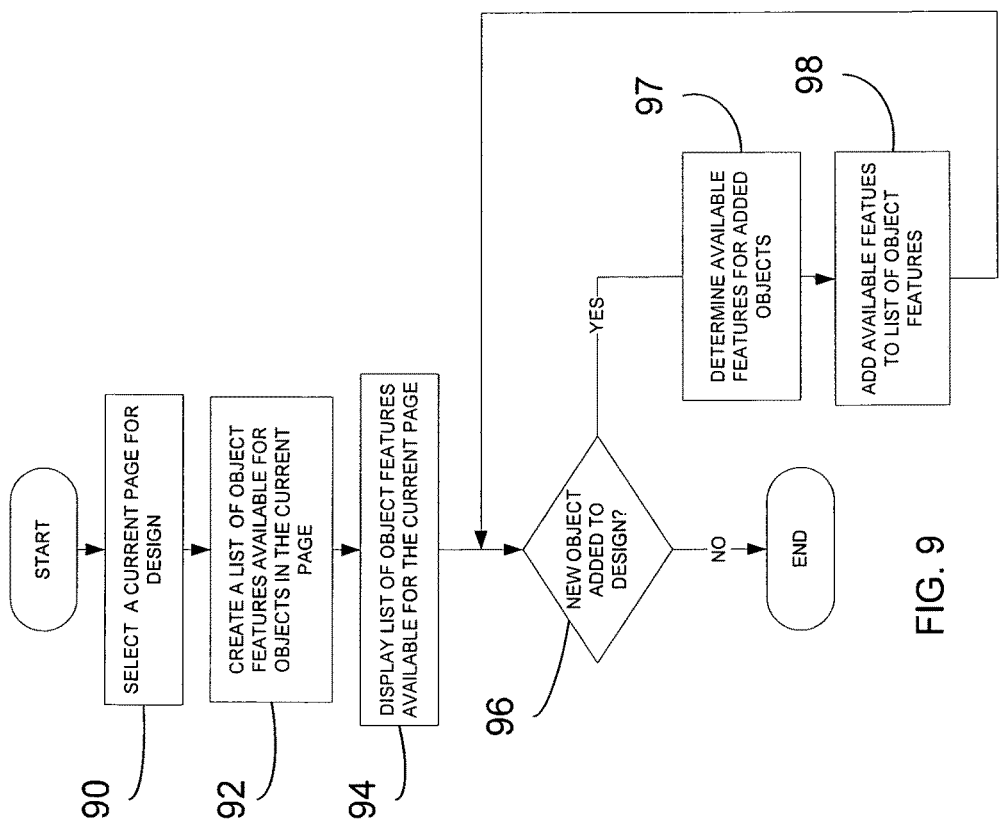
FIG. 9 is a flow diagram illustrating object feature filtering in a GUI builder, according to an example embodiment.

For example, where the page or state includes a text box and the text box has only a subset of fonts and colors available, the tools section may include only those fonts and colors available for the text box. FIG. 9 illustrates a method for filtering objects and object features in a GUI builder. Upon selection of a current page for design, 90, the process creates a list of object features available for objects in the current page or state, 92. The list is displayed, 94, providing only those tools, features, objects, etc. available to the designer for the current configuration under consideration and design. If a new object is added to the design, 96, the process determines a set of available features for the newly added objects, 97. The set of available features is added to the list of features currently displayed in the GUI builder. Alternate embodiments may filter one or multiple objects, tools, etc. providing a variety of options to the designer.

Another example of filtering is applied to presentation of editing selections within the IDE, such as font options for a text box. Within the IDE the user selects a text box. A list of available fonts is provided. In addition, a corresponding list of components within the current project where the font is available, or where the font is currently used may also be presented.

The filtering processes described herein may be initiated by a search entered into a text-entry search field, may be automated based on designer selection in the GUI builder, may be automated based on historical use of the GUI builder in building a given user interface, or may be suggested for selection by the designer. In the latter case, the filtering process may identify a filtering criteria, such as identifying a salient feature of a page selected and currently under design in the work space 64. The filtering methods of the example embodiments may be obtained through the use of set operations. These set operations may include union (∪), intersection (∅), set difference (−), Cartesian product (×), or some other suitable set operation. Additionally, example embodiments may implement conditional statements as part of a search query.

Figure 10:
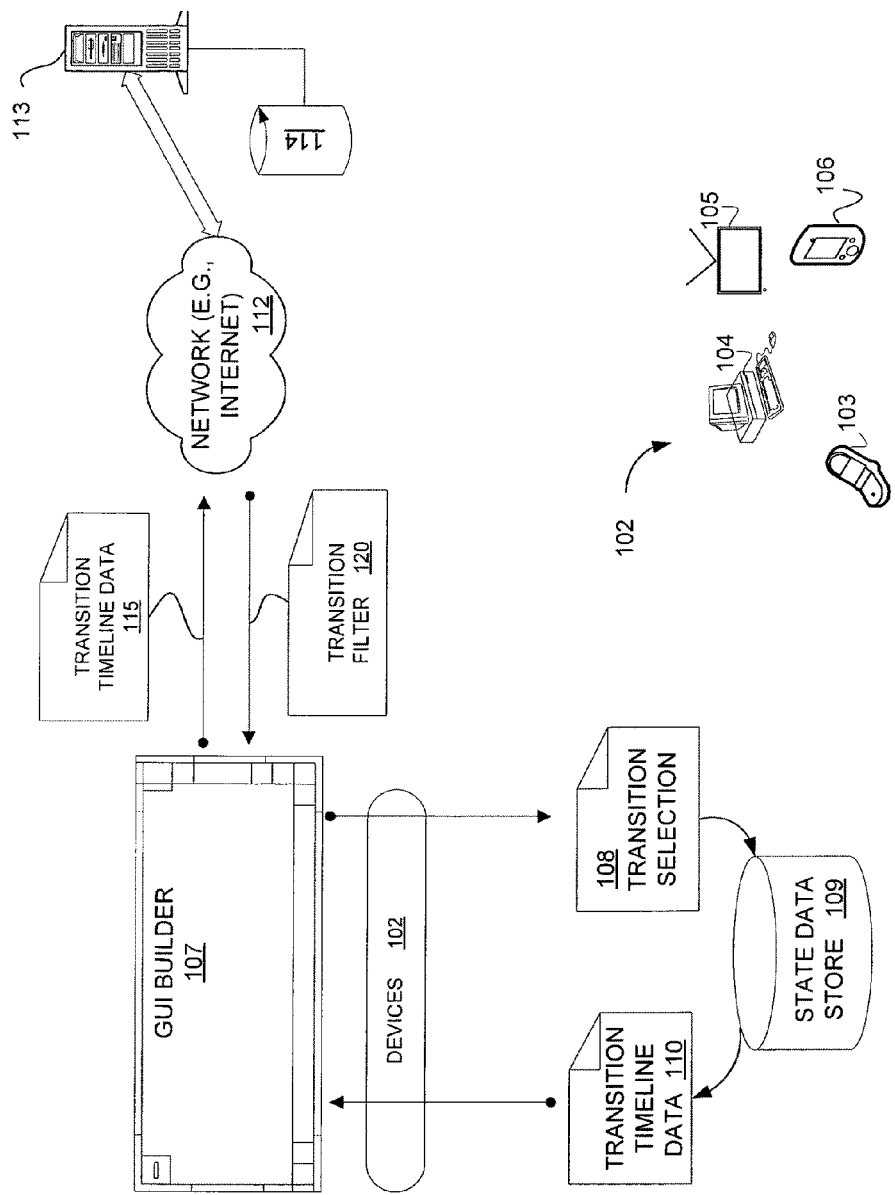
FIG. 10 is a diagram of a system, according to an example embodiment, used to generate a transition selection and to receive transition timeline data.

FIG. 10 is a diagram of an example system 100 used to generate a transition selection and to receive transition timeline data. As illustrated, a user 101 may access any one of a number of devices 102 to generate a transition selection 111. The devices 102 include a cell phone 103, a computer system 104, a television or monitor 105, a Personal Digital Assistant (PDA) 106 or a smart phone (not shown). The transition filter 111 is generated through the use of an IDE or a GUI builder 107. A GUI builder may be part of an IDE or may be used in conjunction with an IDE. This transition filter 111 may be transmitted by one of the devices 102 across a network 112, and formatted using an eXtensible Markup Language (XML), a Macromedia-XML (MXML), ActionScript, JavaScript, Hyper Text Markup Language (HTML), or some other suitable format. In this example, the transition filter 111 is then received by a GUI builder server 113.

Communicatively coupled to the GUI builder server 113 is a database 114. Communicatively coupled may include a physical or logical connection between the GUI builder server 113 and the database 114. Further, this database 114 may reside native or non-natively on the GUI builder server 113. The GUI builder server 113 retrieves transition timeline data 115 from the database 114, and/or may generate this transition timeline data 115 through the methods and operations discussed below. The transition timeline data is formatted as XML, MXML, ActionScript, HTML, or some other suitable language. This transition timeline data 115 is transmitted back across the network 112 and received by one of the devices 102 for display within the GUI builder 107.

In some example embodiments, a transition selection 108 is transmitted by one of the devices 102 to a database 109. The transition selection 108 may be formatted as a database query using a Structured Query Language (SQL), or some other suitable format. A transition timeline data 110 is retrieved by one of the devices 102 and processed and displayed within the GUI builder 107. This transition timeline data 110 may be formatted using XML, MXML, ActionScript, HTML, or some other suitable language. In some example embodiments, the database 109 may be a native or non-native database that is communicatively coupled to one of the devices 102.

Figure 11:
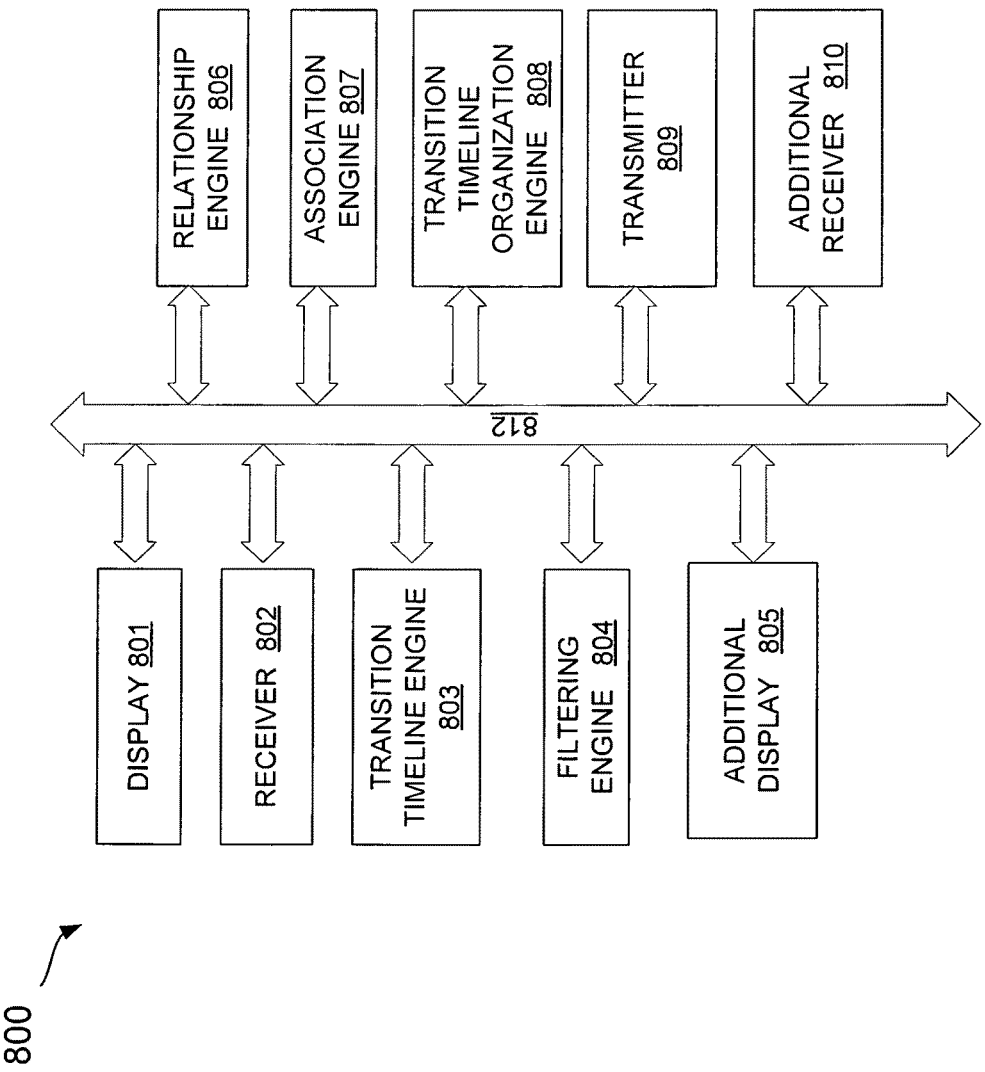
FIG. 11 is a block diagram of a computer system, according to an example embodiment, used to receive transition selections and generate transition timeline data.

FIG. 11 is a block diagram of an example computer system 800 used to generate objects and features, create sets of object-related features, filter the sets of object-related features, receive transition selection information and generate transition timelines. The blocks shown herein may be implemented in software, firmware, or hardware. These blocks may be directly or indirectly communicatively coupled via a physical or logical connection. The computer system 800 may be part of the one or more devices 102 shown in FIG. 10.

The system of FIG. 11 is a computer system 800 and may be used to implement a method for generating transition timeline data for state transitions and filtering the transition timeline data. The computer system 800 is adapted to generate transition timeline data for state transitions in a user interface design tool, wherein each state transition corresponds to a transition between respective states of the user interface. In this way, each state of the user interface is defined at least partially by configuration of at least one object to be displayed within the user interface when the user interface is in the respective state. The computer system 800 further is adapted to filter the transition timeline data as a function of at least one state of the user interface to generate a filtered set of transitions for display as a subset of the transition timeline data. The computer system 800 filters transition timeline data by receiving a selection of an originating page and creating a set or list of transitions associated with the originating page. This list may include transitions to or from the originating page. Further, the filtering may involve selection of a target or destination page and creation of a set or list of transitions associated with the target page. In another example, the filtering may be triggered and a function of a search query for a requested search of a set of state transitions.

In another example, the computer system 800 may generate a set of object features for a plurality of objects in a user interface and filter the set of object features as a function of at least one state of the user interface to generate a filtered set of object features. Here, each state is defined at least partially by configuration of at least one object to be displayed within the user interface when the user interface is in the state. The computer system 800 is also adapted to present the filtered set of object features for display on a display device associated with a computer system.

Continuing with FIG. 11, shown are blocks 801 through 810 communicatively coupled to a communication bus 812. Illustrated is a display controller 801 to control display of a first visual representation of a configuration of objects (first page) and of a second visual representation of a configuration of objects (second page), each object having features defining visual, audio, and/or functional operation of the object. An input receiver 802 is adapted to receive input selections for an object, wherein the input selections allow the user to select a feature or features of the object for each page. The received input may specify a next transition, such as from a first page to a second page, and the specifics of that transition for a given object. The transition timeline engine 803 generates transition timeline data. In one example, the transition timeline engine 803 creates a set of all possible transitions within a given application. In some example embodiments, the transition timeline data provides transition timing information for each object on the page. This may also include an effect bar, a start target (e.g. first page), or an end target page (e.g. second page). In some example embodiments, the transition may be specified has having a move effect, a wipe effect, a resize effect, a fade-in effect, an auditory effect, or a fade-out effect. These are provided for illustration, and other effects are similarly considered. While designing a given page, or object on a page, the designer may find the complete set of possible transition information too exhaustive and cumbersome to use, and therefore, a filtering engine 804 is provided to filter the set of transitions and form a subset of transitions. In one example, the filtering engine 804 generates a subset of transitions involving a given page. In other words, the subset includes only those transitions in which that page is either a start target or end target. In another example, the filtering engine 804 generates a subset of feature information related to a given object. In this case, a complete set of shapes available for buttons may be filtered to form a subset of shapes available for page forward and page back buttons. Other examples employ the filtering engine 804 to filter object-related features as described herein. Additional display controller 805 controls display of the transition timeline data as part of a transition timeline display area, the transition timeline display area including at least one page having at least one object, wherein the object is specified by features. In some example embodiments, the transition of the selected object from the first page to the second page is represented as occurring over time. In some example embodiments, the transition of the selected object from the first page to the second page is represented as occurring at a completion of an event. These specifics are included in the displayed transition timeline data.

Continuing with FIG. 11, further coupled to the communication bus 812 is a relationship engine 806, for developing relationships among objects. As a page may be considered an object, at a high level the relationship engine 806 associates pages having some commonality. For example, the relationship engine 806 may associate two pages if there is a defined transition between these pages. For example, page 1 of FIG. 1 and page 2 of FIG. 3 are related by a transition. The transition is initiated by selection (e.g. by double click of a mouse) of the START TOUR button 53. The relationship engine 806 may build relationships on other criteria, such as all pages having a same object are considered related. The relationship engine 806 effectively catalogues the objects, including pages, of the user interface design. This allows the relationships to be used to recall related objects. In addition to the relationship engine 806, the computer system 800 includes an association engine 807. When the receiver 801 receives a transition selection identifying an object and feature for that object. The association of the object to feature information is created and maintained by the association engine 807. When a user selects an object for use in a design, the association engine provides the possible features available for the object. A transition timeline organization engine 808 is adapted to organize the transition specifics into a transition timeline data. Further, a transmitter 809 and an additional receiver 810 are communicatively coupled to communication bus 812. The transmitter 809 allows the computer system 800 to transmit the transition timeline data, such as for display in a user interface.

In an alternate embodiment, the transition timeline organization engine may be relationship engine for determining relationships among objects, features and components of the IDE. In this way, transition timeline engine 804 may be a object-related feature engine.

Some embodiments may include the various databases (e.g., 109, and 114) being relational databases, or, in some cases, On Line Analytic Processing (OLAP)—based databases. In the case of relational databases, various tables of data are created and data is inserted into and/or selected from these tables using SQL or some other database-query language known in the art. In the case of OLAP databases, one or more multi-dimensional cubes or hyper cubes, including multidimensional data from which data is selected from or inserted into using a Multidimensional Expression (MDX) language, may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Some example embodiments may include remote procedure calls being used to implement one or more of the above-illustrated operations or components across a distributed programming environment. For example, a logic level may reside on a first computer system that is located remotely from a second computer system including an interface level (e.g., a GUT). These first and second computer systems can be configured in a server-client, peer-to-peer, or some other configuration. The various levels can be written using the above-illustrated component design principles and can be written in the same programming language or in different programming languages. Various protocols may be implemented to enable these various levels and the components included therein to communicate regardless of the programming language used to write these components. For example, an operation written in C++ using Common Object Request Broker Architecture (CORBA) or Simple Object Access Protocol (SOAP) can communicate with another remote module written in Java™. Suitable protocols include SOAP, CORBA, and other protocols well-known in the art.

Figure 12:
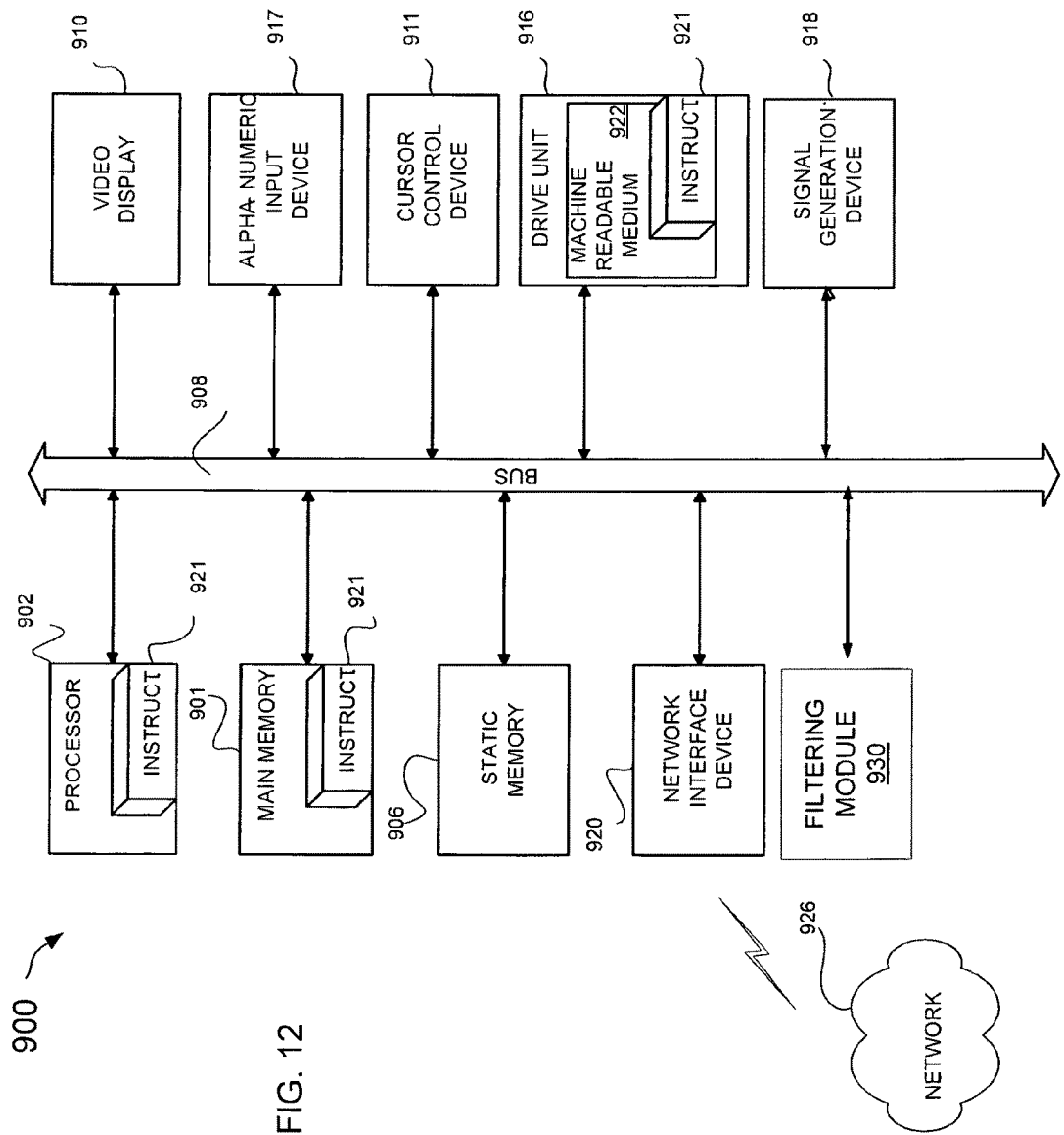
FIG. 12 shows a diagrammatic representation of a machine in the form of a computer system, according to an example embodiment, that executes a set of instructions to perform any one or more of the methodologies discussed herein.

FIG. 12 shows a diagrammatic representation of a machine in the example form of a computer system 900 that executes a set of instructions to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment or as a peer machine in a peer-to-peer (or distributed) network environment. The machine may be a Personal Computer (PC), a tablet PC, a Set-Top Box (STB), a PDA, a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 900 includes a processor 902 (e.g., a CPU, a Graphics Processing Unit (GPU) or both), a main memory 901, and a static memory 906, which communicate with each other via a bus 908. The computer system 900 may further include a video display unit 910 (e.g., a Liquid Crystal Display (LCD) or a Cathode Ray Tube (CRT)). The computer system 900 also includes an alphanumeric input device 917 (e.g., a keyboard), a User Interface (UI) (e.g., GUI) cursor controller 911 (e.g., a mouse), a drive unit 916, a signal generation device 918 (e.g., a speaker) and a network interface device (e.g., a transmitter) 920.

The disk drive unit 916 includes a machine-readable medium 922 on which is stored one or more sets of instructions and data structures (e.g., software 921) embodying or used by any one or more of the methodologies or functions illustrated herein. The software instructions 921 may also reside, completely or at least partially, within the main memory 901 and/or within the processor 902 during execution thereof by the computer system 900, the main memory 901 and the processor 902 also constituting machine-readable media.

The instructions 921 may further be transmitted or received over a network 926 via the network interface device 920 using any one of a number of well-known transfer protocols (e.g., Hyper Text Transfer Protocol (HTTP), Secure Hyper Text Transfer Protocol (HTTPS)).

A filtering module 930 is communicatively coupled to bus 908. The filtering module implements the filtering and subset generation discussed in the examples provided herein. Specifically, the filtering module 930 controls function of the filtering engine 804 of FIG. 11, and works with the relationship engine 806 and the association engine 807. In the example of FIG. 11, the filtering module 930 provides filtered subset information to transition timeline engine 803. The filtering module 930 may be used for filtering related transition data, object data, or feature data.

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies illustrated herein. The term "machine-readable medium" shall accordingly be taken to include, but not limited to, solid-state memories, optical and magnetic media. In one embodiment, techniques may be implemented by transmissions on carrier wave signals.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may begat least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "Software as a Service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

In some example embodiments, the system and method as illustrated herein may be used to validate documents, where the authentication of the content of the document and the author of the document may be required. This document may be, for example, a university transcript, birth certificate, or other suitable document.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
receiving a selected user interface page from a plurality of user interface pages provided for manipulation in a user interface design tool, wherein the selected user interface page includes at least one user interface object, and wherein the at least one user interface object has a plurality of configurations;
receiving a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;
generating transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;
filtering, by the software application GUI builder, the generated transition timeline data based on a received search request, the received search request including at least one of a particular user-triggered state transition, a particular type of user interface object, a combination of types of user interface objects, a user interface object feature, and the ending page state; and
providing, by the software application GUI builder, the filtered transition timeline data for the selected user interface page.

2. The computer-implemented method of claim 1, wherein the generated transition timeline data presents an animation of at least the first user-triggered state transition.

3. The computer-implemented method of claim 1, wherein the generated transition timeline data includes feature data that corresponds to each user interface object associated with the selected user interface page.

4. The computer-implemented method of claim 1, wherein each at least one user interface object is associated with at least one user interface object feature.

5. The computer-implemented method of claim 4, wherein a first feature of the at least one corresponding feature is a particular font type.

6. The computer-implemented method of claim 4, wherein the particular type of user interface object corresponds to at least a portion of the at least one user interface object feature.

7. The computer-implemented method of claim 1, wherein the particular type of user interface object is a text box.

8. A non-transitory machine-readable medium comprising instructions, which when implemented by one or more machines, cause the one or more machines to perform operations comprising:
receiving a selected user interface page from a plurality of user interface pages provided for manipulation in a user interface design tool, wherein the selected user interface page includes at least one user interface object, and wherein the at least one user interface object has a plurality of configurations;
receiving a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;
generating transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;

filtering, by the software application GUI builder, the generated transition timeline data based on a received search request, the received search request including at least one of a particular user-triggered state transition, a particular type of user interface object, a combination of types of user interface objects, a user interface object feature, and the ending page state; and providing, by the software application GUI builder, the filtered transition timeline data for the selected user interface page.

9. The non-transitory machine-readable medium of claim 8, wherein based on the received search request including the ending page state, the filtered transition timeline data includes at least one user interface object feature that is associated with each at least one user interface object corresponding to the ending page state.

10. The non-transitory machine-readable medium of claim 8, wherein at least a second user interface object of the at least one user interface object is configured to initiate at least a third user-triggered state transition associated with the selected user interface page, and wherein the third user-triggered state transition corresponds to a third direct transition from the starting page state to a different page state of the plurality of page states.

11. The non-transitory machine-readable medium of claim 10, the generated transition timeline data further including at least the third user-triggered state transition and a fourth user-triggered state transition that corresponds to a fourth direct transition from the different page state to the starting page state.

12. The non-transitory machine-readable medium of claim 8, wherein the particular type of user interface object corresponds to at least a first feature of the at least one user interface object feature.

13. The non-transitory machine-readable medium of claim 12, wherein the particular type of user interface object is a text box, and the first feature of the at least one feature is a particular font type.

14. A computerized system comprising:
one or more processors; and
one or more computer storage media storing computer-usable instructions that, when used by the one or more processors, cause the one or more processors to:
receive a selected user interface page from a plurality of user interface pages provided for manipulation in a user interface design tool, wherein the selected user interface page includes at least one user interface object, and wherein the at least one user interface object has a plurality of configurations;
receive a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;

generate transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;

filter, by the software application GUI builder, the generated transition timeline data based on a received search request, the received search request including at least one of a particular user-triggered state transition, a particular type of user interface object, a combination of types of user interface objects, a user interface object feature, and the ending page state; and provide, by the software application GUI builder, the filtered transition timeline data for the selected user interface page.

15. The system of claim 14, wherein the generated transition timeline data presents an animation of at least the first user-triggered state transition.

16. The system of claim 14, wherein each at least one user interface object is associated with at least one user interface object feature.

17. The system of claim 16, wherein a first feature of the at least one user interface object feature is a particular font type.

18. The system of claim 16, wherein the particular type of user interface object corresponds to at least a portion of the at least one user interface object feature.

19. A non-transitory machine-readable medium comprising instructions, which when implemented by one or more machines, cause the one or more machines to perform operations comprising:
receiving a selected user interface page from a plurality of user interface pages provided for manipulation in a user interface design tool, wherein the selected user interface page includes at least one user interface object, and wherein the at least one user interface object has a plurality of configurations;
receiving a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;
generating transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;
filtering, by the software application GUI builder, the generated transition timeline data based on a received search request including at least the ending page state; and
providing, by the software application GUI builder, the filtered transition timeline data for the selected user interface page, wherein the filtered transition timeline data includes at least configuration information associated with each at least one user interface object when the at least one user interface object is in the unique presentation that corresponds to the ending page state.

20. A computer-implemented method comprising:
receiving a selected user interface page from a plurality of user interface pages provided for manipulation in a user interface design tool, wherein the selected user interface page includes at least one user interface object, and wherein the at least one user interface object has a plurality of configurations;
receiving a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;
generating transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;
filtering, by the software application GUI builder, the generated transition timeline data based on a received search request including a particular type of user interface object; and
providing, by the software application GUI builder, the filtered transition timeline data for the selected user interface page, wherein the filtered transition timeline data includes a set of user interface objects of the particular type from the at least one user interface object, and at least one user interface object feature that corresponds to each user interface object in the set of user interface objects.

21. A computerized system comprising:
one or more processors; and
one or more computer storage media storing computer-usable instructions that, when used by the one or more processors, cause the one or more processors to:
receive a selected user interface page from a plurality of user interface pages provided for manipulation in a user interface design tool, wherein the selected user interface page includes at least one user interface object, and wherein the at least one user interface object has a plurality of configurations;
receive a starting page state selected from a plurality of page states associated with the selected user interface page, wherein each page state corresponds to a unique presentation of the at least one user interface object, wherein at least a first user interface object of the at least one user interface object is configured to initiate at least a first user-triggered state transition associated with the selected user interface page, and wherein the first user-triggered state transition corresponds to a first direct transition from the starting page state to an ending page state of the plurality of page states;
generate transition timeline data associated with the selected user interface page, the generated transition timeline data including at least the first user-triggered state transition and a second user-triggered state transition that corresponds to a second direct transition from the ending page state to the starting page state, wherein the generated transition timeline data is displayed by a software application GUI builder;
filter, by the software application GUI builder, the generated transition timeline data based on a received search request, the received search request including one of the first user-triggered state transition and the second user-triggered state transition; and
provide, by the software application GUI builder, the filtered transition timeline data for the selected user interface page, wherein the filtered transition timeline data includes at least first configuration information associated with the at least one user interface object in a first unique presentation that corresponds to the starting page state, and second configuration information associated with the at least one user interface object in a second unique presentation that corresponds to the ending page state.

* * * * *